United States Patent [19]

Thomas

[11] Patent Number: 5,516,561

[45] Date of Patent: May 14, 1996

[54] APPLYING A FLUOROPOLYMER FILM TO A BODY

[75] Inventor: Thomas R. Thomas, Dingwall, Scotland

[73] Assignee: British Technology Group Ltd., London, England

[21] Appl. No.: 167,966

[22] PCT Filed: Jun. 19, 1992

[86] PCT No.: PCT/GB92/01111

§ 371 Date: Apr. 26, 1994

§ 102(e) Date: Apr. 26, 1994

[87] PCT Pub. No.: WO93/00394

PCT Pub. Date: Jul. 1, 1993

[30] Foreign Application Priority Data

Jun. 20, 1991 [GB] United Kingdom .................... 9113350

[51] Int. Cl.[6] .................... B05D 3/64; C08J 7/18
[52] U.S. Cl. .................... 427/490; 427/255.6; 427/534; 427/536; 427/245
[58] Field of Search .................... 427/255.6, 255.1, 427/490, 245, 534, 536

[56] References Cited

U.S. PATENT DOCUMENTS

| | | | |
|---|---|---|---|
| 3,700,489 | 10/1972 | Borysko | 427/255.6 |
| 4,391,843 | 7/1983 | Kaganowicz et al. | 427/490 |
| 4,479,982 | 10/1984 | Nilsson et al. | 427/490 |
| 4,729,906 | 3/1988 | Kleeberg et al. | 427/490 |
| 4,869,922 | 9/1989 | D'Agostino et al. | 427/490 |
| 5,041,304 | 8/1991 | Kusano | 427/255.6 |
| 5,087,776 | 2/1992 | Tonelli et al. | 570/134 |
| 5,091,204 | 2/1992 | Ratner et al. | 427/490 |
| 5,244,730 | 9/1993 | Nguyen et al. | 427/490 |
| 5,246,451 | 9/1993 | Trescony et al. | 427/490 |
| 5,387,378 | 2/1995 | Pintauro et al. | 427/244 |
| 5,411,769 | 5/1995 | Hornbeck | 427/255.6 |

FOREIGN PATENT DOCUMENTS 0247771  12/1987  European Pat. Off. .
90/13593  11/1990  WIPO .

OTHER PUBLICATIONS

Journal Of Polymer Science, Polymer Chemistry Edition, vol. 18, 1980, pp. 407–425 Clark & Shuttleworth (no month).

Thin Solid Films, vol. 38, No. 2, 1976, pp. 171–182 Pachonik: 'Erzeugung Dunner Glimmpolymerisierter Schichten', no month available.

World Patents Index Latest, Week 8528, 3 Jun. 1985, Derwent Publications Ltd., London, GB AN 169068 and JP,A, 60 099 326 (Agency Of Ind. Sci. Tech.) 3 Jun. 1985, see abstract.

World Patents Index Latest Week 8626, 15 May 1986, Derwent Publications Ltd., London, GB: AN 165034 & JP,A,61 097 008 (Mitsubishi Chem. Ind. K.K.) 15 May 1986 see abstract.

Japanese Application No. 62–204826 (English translation).

*Primary Examiner*—Diana Dudash
*Attorney, Agent, or Firm*—Cushman, Darby & Cushman

[57] ABSTRACT

A thin fluoropolymer film is covalently bonded to a microporous ptfe film to make a bilayer for separation, filtration or reverse osmosis, by exposing the microporous film to perfluorocyclohexane under plasma.

8 Claims, No Drawings

APPLYING A FLUOROPOLYMER FILM TO A BODY

This invention relates to applying a fluoropolymer film to a body, especially to porous and microporous films of fluoropolymers, and extends to coated bodies and two layer films Microporous films and membranes from polymers are well known, and asymmetric forms find wide application in filtration and separation. Their manufacture is typically undertaken by a variety of casting processes and other relatively straightforward techniques allowable by the physical and chemical nature of the polymer. Polymers amenable to such straightforward techniques however are thermally, chemically and sometimes physically inferior to the more stable fluoropolymers, e.g. polytetrafluoroethylene (ptfe). Fluoropolymers are selected for their inertness and chemical resistance, and these very properties make it difficult to bond layers of fluoropolymers together. The techniques used for processing ptfe owe more to powder metallurgy than plastics as the material is not a true thermoplastic. The manufacture of such components most usually involves a compression moulding stage and a heat treatment or sintering stage.

PCT Publication NO 90/13593 discloses a mechanical bonding method for porous ptfe layers which are impregnated with perfluoro ion exchange polymer, and further refers to numerous earlier patents in the field. Such a mechanical bond may not be adequate for all applications. Japanese Laid-Open (Kokai) 62-204826 discloses coating a porous ptfe membrance in a plasma vessel by introducing gaseous tetrakis(trifluoromethyl)dithioethane, which forms a polymer in the form of a thin film on the membrane. This introduces sulphur into the product as well as —$CF_3$ groups at the surface, which is unnecessarily hydrophobic for some applications.

These publications do not teach any way of making a well bonded bilayer of pure fluoropolymer. Such a bilayer could find application in filtration, separation or reverse osmosis.

It would thus be desirable to solve the problem of formation of a very thin continuous layer of fluoropolymer strongly bonded to the surface of a microporous fluoropolymer substrate.

According to the present invention, a method of applying a fluoropolymer film to a body comprises exposing the body to fragments exclusively of the formula —$C_nF_{2n}$—, under conditions whereby the fragments combine on the surface of the body to form an adherent fluoropolymer layer. Also according to the invention, a method of applying a fluoropolymer film to a body comprises exposing the body to a supply of saturated molecules of the formula $C_nF_{2n}$, causing scission of the molecules, and allowing the fragments to combine on the surface of the body to form an adherent fluoropolymer layer. The body may be carbonaceous polymer e.g. a fluoropolymer such as ptfe, optionally itself a film, which may be porous or microporous, in which case the layer will be covalently bonded thereto. The molecules may be cyclo-perfluoroalkanes e.g. $C_nF_{2n}$ where n=4–8, preferably 6. The reason for preferring perfluorocycloalkane is that It can undergo scission affording only multiple $CF_2$ units, in particular no $CF_3$ fragments at all. This cannot occur with non-cyclic saturated fluoroalkanes. This allows the product to be as close to ptfe, i.e. $CF_2$ linkages, as possible, avoiding multiple $CF_3$ fragments, which are more hydrophobic than $CF_2$. Of the perfluorocycloalkanes, the butane tends to instability, the pentane is possible, while the heptane and octane are becoming exotic for no real gain. The hexane is therefore the most preferred, from cost, stability, availability and volatility points of view.

The body may be etched with a noble gas plasma e.g. argon at say 10–30W, for the purpose of cleaning, before the film is applied. Thereafter, the body may be subjected to a somewhat gentle plasma irradiation, preferably <5W, e.g. 0.1–50W, in a chamber which may be evacuated to 0.01 to 5 torr, such as 0.2 to 0.3 torr, of fluorocarbon. Expressed in terms of unit area-to-be-coated of the body, preferred plasma powers are <100W/$m^2$, e.g. 2–1000W/$m^2$. Lower powers lessen undesirable cross-linking.

As a new product in its own right, the invention provides a carbonaceous polymer (e.g. ptfe) body covalently bonded to a fluoropolymer film. Likewise as a new product, the invention provides a two layer fluoropolymer film containing no atoms other than of carbon and halogen and which cannot be delaminated by hand.

A specific embodiment of the invention will now be described by way of example, for producing a continuous film of plasma polymer upon a microporous polymeric substrate.

Microporous ptfe film manufactured by the Mupor™ procedure, European Patent 247771, is the substrate to be coated. A 0.06$m^2$ sample of it is placed in an enclosure which is then evacuated to low pressures, about 0.05 torr, to remove air and moisture. Plasma of power 5W is then generated in the enclosure via say high voltage, 3000 to 40000 volts or by a high frequency generator, say 10MHz or 13.56MHz. Perfluorocyclohexane at 0.2 torr is introduced into the cavity at 0.2 ml/mln.

Under these conditions very reactive species are produced which in turn react with the surface of the article, which reactive sites can then in turn react with monomeric species introduced into the enclosure. The experimental conditions required will vary from one system to another and the techniques and durations employed similarly can be varied to suit individual requirements, e.g. 'etching' where surfaces can be cleaned by the gradual erosion of the surface by reactive species, plasma polymerisation and plasma initiated 'grafting'. The cyclo-$C_6F_{12}$ is subjected to a sufficiently high electron voltage to generate perfluoro fragments, e.g. $CF_2$, $C_2F_4$, $C_3F_6$. These species then react to form a layer of plasma polymer across, and covalently bonded to, the surface and, in so doing, fill the pore entrances, eventually building into a controlled continuous thin film, the process being terminated when the required properties have been attained. Coating a ptfe film having 4-micron pores under these conditions for 10 minutes yielded a coating several microns thick completely sealing the pores. For typical smaller-pore films, a useful product may be attained in say 2 minutes.

It will be noted that the process occurs in the gas phase under very mild conditions. The plasma generated within the cyclohexane atmosphere creates active fragments (radicals etc) based on $CF_2$ units which polymerise and attach to the surface of the membrane in situ, which itself remains at a temperature of around 300K.

Clearly careful control will ensure the thinnest continuous layer to maximise the aqueous flow rates during e.g. reverse osmosis separations of saline or brackish water.

Such materials have great utility in the field of filtration and separation allowing for the first time a membrane filter with the chemical, biological and thermal advantages of ptfe but with advantageous flux rates associated with the very thin active layer.

Other so-called anisotropic ptfe filters have poor bond strength between the substrate and the active layer. This technique not only allows great control over the film properties but ensures the strongest possible adhesion to the substrate.

The process is both rapid and cost effective and additionally has wide applicability in the separation field. For example composite materials can be manufactured with great savings, e.g. in those situations where the active layers are very expensive a lower cost substrate can be used thus minimising the quantity of the active layer.

A further application embodies dissimilar monomeric species attached to both sides of the substrate, and additionally the technique is equally effective on other geometries, e.g. tubular and granular forms of the substrate ptfe. This now allows separations of materials in areas of chromatography normally restricted to silica-based phases.

I claim:

1. A method of applying a fluoropolymer film to a porous or microporous film, comprising exposing the porous or microporous film to plasma irradiation wherein the plasma power is less than 5 w and to a supply of saturated molecules of the formula $C_nF_{2n}$, where n is from 4 to 8, causing scission of the molecules, whereby fragments combine on the surface of the porous or microporous film to form an adherent fluoropolymer layer.

2. A method of applying a fluoropolymer film to a porous or microporous film of carbonaceous polymer, comprising exposing the porous or microporous film to plasma irradiation wherein the plasma power is less than 5 w and to a supply of saturated molecules of the formula $C_nF_{2n}$, where n is from 4 to 8, causing scission of the molecules, whereby fragments combine on the surface of the porous or microporous film to form a fluoropolymer layer covalently bonded to the film.

3. A method according of claims 1 or 2, wherein the molecules are of cycloperfluoroalkane.

4. A method according to claims 1 or 2, wherein the molecules are of cyclo-$C_nF_{2n}$ where n=4, 5, 7 or 8.

5. A method according to claims 1 or 2, wherein the molecules are of cycloperfluorohexane.

6. A method according to claims 1 or 2, wherein the porous or microporous film is etched before the application of said fluoropolymer film thereto.

7. A method according to claims 1 or 2, performed in a chamber evacuated to 0.01 to 5 torr.

8. A method according to claims 1 or 2, wherein the porous or microporous film is polytetrafluoroethylene.

* * * * *